(12) United States Patent
Gosden

(10) Patent No.: US 11,112,018 B2
(45) Date of Patent: Sep. 7, 2021

(54) SAFETY VALVE FOR HYDRAULIC OR PNEUMATIC TOOL

(71) Applicant: Ogon Contracting Pty Ltd., Byford (AU)

(72) Inventor: Luke Roger Gosden, Byford (AU)

(73) Assignee: Ogon Contracting Pty Ltd., Byford (AU)

( * ) Notice: Subject to any disclaimer, the term of this patent is extended or adjusted under 35 U.S.C. 154(b) by 0 days.

(21) Appl. No.: 16/796,995

(22) Filed: Feb. 21, 2020

(65) Prior Publication Data

US 2020/0224778 A1   Jul. 16, 2020

Related U.S. Application Data

(63) Continuation of application No. 15/544,525, filed as application No. PCT/AU2016/050024 on Jan. 19, 2016, now Pat. No. 10,571,032.

(30) Foreign Application Priority Data

Feb. 3, 2015  (AU) .............................. 2015900326

(51) Int. Cl.
   *F16K 11/07*   (2006.01)
   *F16K 31/60*   (2006.01)
   (Continued)

(52) U.S. Cl.
   CPC .......... *F16K 11/0716* (2013.01); *F16K 11/07* (2013.01); *F16K 17/168* (2013.01);
   (Continued)

(58) Field of Classification Search
   CPC ........ F16K 17/168; F16K 31/44; F16K 11/07; F16K 31/602; F16K 21/04;
   (Continued)

(56) References Cited

U.S. PATENT DOCUMENTS 2,652,071 A   9/1953  Morrison
3,882,883 A   5/1975  Droegemueller
(Continued)

FOREIGN PATENT DOCUMENTS

CA   2808708 A1   9/2014

OTHER PUBLICATIONS

Damir Budinski, International Search Report, dated Mar. 3, 2016, WIPO by Australian Patent Office, Woden, AU.
(Continued)

*Primary Examiner* — Matthew W Jellett
*Assistant Examiner* — Christopher D Ballman
(74) *Attorney, Agent, or Firm* — Rao DeBoer Osterrieder, PLLC; Erik J. Osterrieder

(57) ABSTRACT

Provided is a safety valve (10) comprising a body (12) which defines an incoming fluid passage (14) and a return fluid passage (20). The incoming fluid passage (14) generally enables a fluid to pass from a fluid reservoir (18) through the body (12) to the tool head (16). The return fluid passage (20) generally enables a fluid to return from the tool head (16) through the body back to the fluid reservoir (18). The body (12) further comprises a diverter (22) which is displaceable between an active position and an inactive position. When the diverter (22) is in the active position, the diverter (22) redirects the fluid via a shunting passage (24) from the incoming fluid passage (14) to the return passage (20) to prevent operation of the tool head (16).

22 Claims, 6 Drawing Sheets

(51) Int. Cl.
  *F16K 17/168*  (2006.01)
  *F16K 35/02*   (2006.01)
  *F16K 31/44*   (2006.01)
  *F16P 3/00*    (2006.01)
  *F15B 13/04*   (2006.01)
  *F15B 20/00*   (2006.01)
  *F16K 21/04*   (2006.01)
  *F16K 27/02*   (2006.01)
  *F04B 23/00*   (2006.01)

(52) U.S. Cl.
  CPC ............ *F16K 31/44* (2013.01); *F16K 31/602* (2013.01); *F16K 35/025* (2013.01); *F16P 3/00* (2013.01); *F04B 23/00* (2013.01); *F15B 13/0401* (2013.01); *F15B 20/00* (2013.01); *F16K 21/04* (2013.01); *F16K 27/0263* (2013.01); *Y10T 137/86107* (2015.04); *Y10T 137/87249* (2015.04)

(58) Field of Classification Search
  CPC ............ F16K 27/0263; F16K 11/0716; F16K 35/025; F15B 13/0401; F15B 20/00; F04B 23/00; F16P 3/00; Y10T 137/86107; Y10T 137/87249
  See application file for complete search history.

(56) References Cited

U.S. PATENT DOCUMENTS

| | | | | |
|---|---|---|---|---|
| 3,963,045 A * | 6/1976 | Damitz | ................ | F15B 11/044 137/505.13 |
| 3,998,132 A * | 12/1976 | Rasigade | ............. | F15B 15/225 91/395 |
| 4,146,056 A | 3/1979 | Buchanan | | |
| 4,190,081 A * | 2/1980 | Coles | .................. | F15B 13/0402 137/624.27 |
| 4,567,914 A * | 2/1986 | Coppola | ............ | F15B 13/0405 137/625.27 |
| 4,712,467 A * | 12/1987 | Foster | .................... | F01B 15/00 91/176 |
| 4,807,311 A | 2/1989 | Ingels | | |
| 4,819,526 A * | 4/1989 | Geise | ...................... | B23B 5/168 408/211 |
| 5,007,778 A * | 4/1991 | Hillestad | ................... | B23B 5/16 408/125 |
| 5,791,557 A | 8/1998 | Kunze | | |
| 6,036,167 A * | 3/2000 | Wade | ...................... | F01P 7/044 123/41.12 |
| 6,220,027 B1 * | 4/2001 | Heusser | .................. | B66F 9/147 60/422 |
| 6,237,634 B1 | 5/2001 | Narita | | |
| 6,857,444 B2 * | 2/2005 | Davis | ..................... | B08B 3/026 137/115.06 |
| 7,784,391 B2 * | 8/2010 | Vallebrant | ............... | B27B 17/08 91/418 |
| 8,091,195 B2 * | 1/2012 | Lin | ........................ | B21J 15/043 29/243.523 |
| 8,122,824 B1 | 2/2012 | Pendleton | | |
| 8,141,790 B2 | 3/2012 | Sheppard | | |
| 9,050,121 B2 | 6/2015 | Doyle | | |
| 9,370,858 B2 * | 6/2016 | Lefavour | .............. | B25B 21/001 |
| 2006/0011457 A1 * | 1/2006 | Robertson | ................ | B24C 9/00 200/51 LM |
| 2008/0245425 A1 * | 10/2008 | Alexander | .............. | B08B 3/026 137/565.13 |
| 2012/0273701 A1 * | 11/2012 | Nguyen | ................ | F16K 31/602 251/98 |
| 2014/0246105 A1 | 9/2014 | Feigel, Jr. | | |

OTHER PUBLICATIONS

Damir Budinski, Written Opinion, dated Mar. 3, 2016, WIPO by Australian Patent Office, Woden, AU.
Neal Schutte, Demand, Jul. 22, 2016, Patenteur Pty. Ltd., Perth, AU.
Damir Budinski, IPER, dated Aug. 11, 2016, WIPO by Australian Patent Office, Woden, AU.
Christopher D. Ballman, Non-Final Office Action on U.S. Appl. No. 15/544,525, dated Jan. 4, 2019, USPTO, Alexandria, VA.
Lekha Gopalakrishnan, Response to Non-Final Office Action on U.S. Appl. No. 15/544,525, dated May 28, 2019, Winstead PC, Dallas, TX.
Christopher D. Ballman, Final Office Action on U.S. Appl. No. 15/544,525, dated Jun. 13, 2019, USPTO, Alexandria, VA.
Lekha Gopalakrishnan, Response to Final Office Action on U.S. Appl. No. 15/544,525, dated Nov. 12, 2019, Winstead PC, Dallas, TX.
Christopher D. Ballman, Notice of Allowance on U.S. Appl. No. 15/544,525, dated Dec. 19, 2019, USPTO, Alexandria, VA.

* cited by examiner

SAFETY VALVE FOR HYDRAULIC OR PNEUMATIC TOOL

REFERENCE TO RELATED APPLICATIONS

This is a continuation application, which claims priority to pending U.S. application Ser. No. 15/544,525 filed on Jul. 19, 2017, which claims priority to PCT/AU16/50024 filed on Jan. 19, 2016, which claims priority to AU provisional application number 2015900326 filed on Feb. 3, 2015, wherein each of the foregoing applications to which priority is claimed are incorporated by this reference in their entireties.

TECHNICAL FIELD

This invention relates to a safety valve for a hydraulic or pneumatic tool, and an associated tool assembly.

BACKGROUND

The following discussion of the background art is intended to facilitate an understanding of the present invention only. The discussion is not an acknowledgement or admission that any of the material referred to is or was part of the common general knowledge as at the priority date of the application.

Hydraulic and pneumatic tools are well known in the art and generally function by means of a fluid, such as a liquid or a gas, being forced (typically under pressure) through a specific tool head in order to induce motion for performing a function.

For example, a hydraulic torque wrench or ratchet relies on a hydraulic fluid, such as oil, to be forced through a tool head where the flow and pressure of the fluid is converted into a rotational force useable to turn nuts, bolts, screws, or the like.

One possible shortcoming of some conventional tools is the requirement of two operators to operate a tool. In such an example, a first operator is typically responsible for controlling a pump or fluid supply used to supply the tool with fluid, whilst a second operator is responsible for positioning the tool at a desired location, such as on a nut or bolt.

For example, in a mining environment, hydraulic wrenches are typically used to undo or tighten bolts on heavy equipment, such as truck wheels or loaders and the like. Such operations typically require loosening or fastening of a large number of nuts or bolts, a task which can become tedious. Also, it is not uncommon that such a task requires two operators, as described above.

This practice often results in injuries, as operators become fatigued and lose concentration. Should there be a breakdown of proper communication between the operators, the first operator may activate a pump or fluid supply used to supply the tool with fluid before the second operator has properly positioned the tool. This typically results in an injury for the second operator. A common injury occurring with the use of such tools is hand injuries through pinching or crushing when the second operator's hand(s) is trapped between the tool and another piece of equipment, or the like.

The following invention seeks to propose a possible solution in amelioration of the above shortcomings.

SUMMARY

According to a first aspect of the invention there is provided a safety valve for a hydraulic or pneumatic tool, comprising:

a body defining an incoming fluid passage via which fluid is able to pass from a fluid reservoir through the body to a tool head, and a return fluid passage via which fluid is able to return from said tool head through the body to the fluid reservoir;

a diverter displaceably arranged between an active position, in which the diverter redirects fluid via a shunting passage from the incoming fluid passage to the return passage to prevent operation of the tool head, and an inactive position, in which fluid is allowed to pass freely through the incoming and return passages to allow operation of the tool head; and biasing means operatively biasing the diverter into either the active or inactive position.

The safety valve may include an actuator on an outside portion of the body, wherein actuation of said actuator counteracts the biasing means and actuates the diverter into either the inactive or active position.

The body may be shaped, dimensioned and configured to engage the tool head in an ergonomic fashion so that an operator is able to use the tool head with the diverter in an easily actuatable location.

It is to be appreciated that the biasing means of the safety valve may be configured for fail-safe or fail-dangerous operation, wherein actuation either allows operation of the tool head, or actuation does not allow the tool head to operate. A preferred embodiment is typically a fail-dangerous configuration, so that when an operator is handling the tool head with safety valve fitted, the diverter is actuated so that said tool head does not operate.

The body may define a tool head connection whereby the tool head is arranged in fluid communication with the incoming and return fluid passages. The tool head connection may comprise fluid hose connectors.

The tool head connection may be configured specifically to connect the safety valve with a HYTORC™ tool head.

The body may define a fluid reservoir connection whereby the fluid reservoir is arranged in fluid communication with the incoming and return fluid passages. The fluid reservoir connection may comprise fluid hose connectors.

The diverter may include a conduit which defines the shunting passage when in the active position. Alternatively, the diverter may redirect fluid to a shunting passage defined by the body when in the active position.

The biasing means may include a spring.

According to a second aspect of the invention there is provided a hydraulic or pneumatic tool assembly comprising:

a tool head;

a fluid reservoir for operatively supplying the tool head with hydraulic or pneumatic fluid; and a safety valve fitted to the tool head, said valve having a body defining an incoming fluid passage via which fluid is able to pass from the fluid reservoir through the body to the tool head, and a return fluid passage via which fluid is able to return from said tool head through the body to the fluid reservoir, a diverter displaceably arranged between an active position, in which the diverter redirects fluid via a shunting passage from the incoming fluid passage to the return passage to prevent operation of the tool head, and an inactive position, in which fluid is allowed to pass freely through the incoming and return passages to allow operation of the tool head; and biasing means operatively biasing the diverter into either the active or inactive position.

The tool head may comprise a HYTORC™ tool head.

The fluid reservoir may comprise a fluid storage means and a pump for supplying the fluid under pressure to the tool head via the safety valve.

The fluid reservoir may be arranged in fluid communication with the safety valve by means of hoses.

The tool assembly may comprise a bi-directional swivel joint arranged in fluid communication with the safety valve and the hoses to allow swiveling of the safety valve with respect to such hoses.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
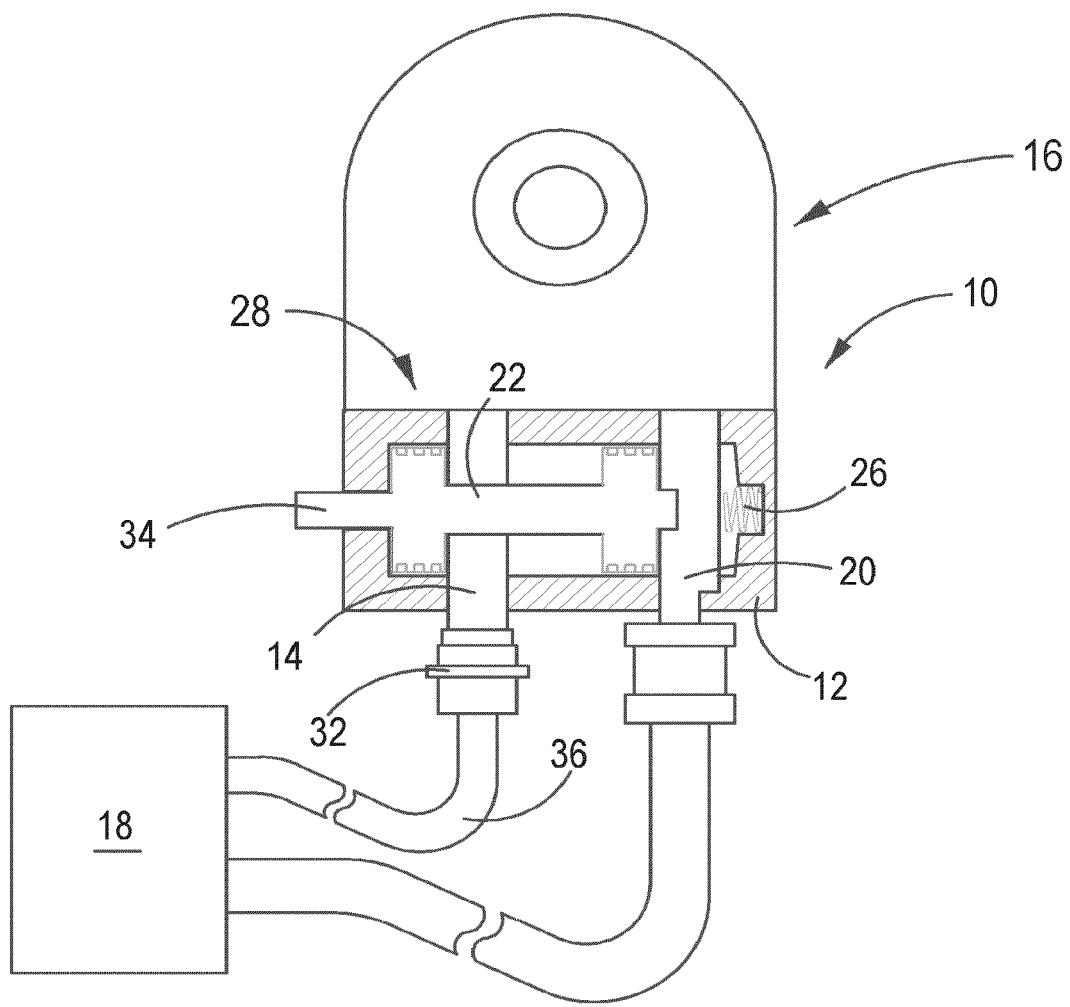
FIG. 1 is a diagrammatic front-sectional representation of one example of a safety valve for a hydraulic or pneumatic tool, in accordance with this disclosure.

The following description provides examples of different embodiments of a safety valve 10 for a hydraulic or pneumatic tool. For example, the example shown in FIG. 1 is an embodiment of a safety valve 10 useable with a HYTORC™ tool head (not shown). In the exemplified embodiment, a conventional swivel joint 16 with swivel pin for mounting a HYTORC™ tool head is shown. As such tools are well known in the art, they will not be described in any detail. Further examples make use of a bi-directional swivel joint 40 (described in more detail below).

However, it is to be appreciated that the safety valve 10 can be applied to a wide variety of hydraulic (liquid operated) or pneumatic (gas operated) tools, such as wrenches, ratchets, drills, saws, percussion tools, and/or the like. Accordingly, the context of this disclosure includes any fluid-operated tools in general. In this description, reference numeral 16 will be used to generally indicate some manner of tool head 16.

Referring now to FIG. 1, the safety valve 10 generally comprises a body 12 which defines an incoming fluid passage 14 and a return fluid passage 20. The incoming fluid passage 14 generally enables a fluid to pass from a fluid reservoir 18 through the body 12 to the tool head 16. The return fluid passage 20 generally enables a fluid to return from the tool head 16 through the body back to the fluid reservoir 18.

The fluid reservoir 18 is generally some manner of fluid storage means and a pump for supplying the fluid under pressure to the tool head 16 via the safety valve 10.

Figure 2:
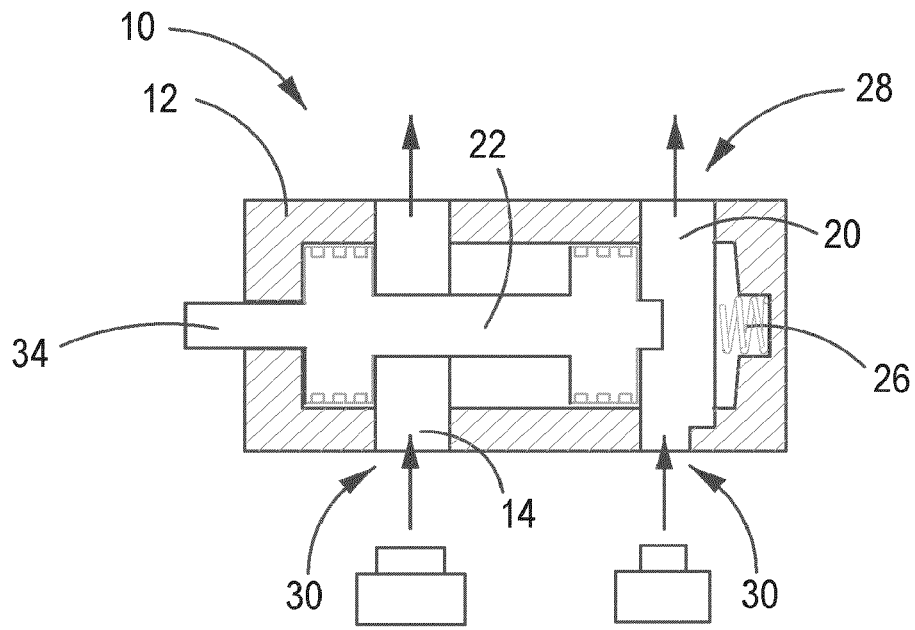
FIG. 2 is a diagrammatic front-sectional representation of the safety valve of FIG. 1 with the diverter in an inactive position.
Figure 3:
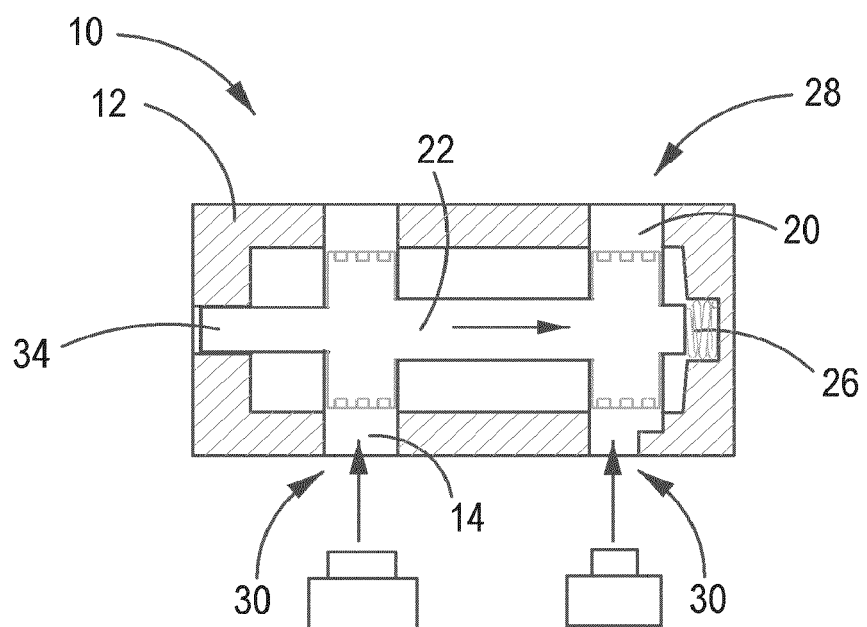
FIG. 3 is a diagrammatic front-sectional representation of the safety valve of FIG. 1 with the diverter in an active position.
Figure 4:
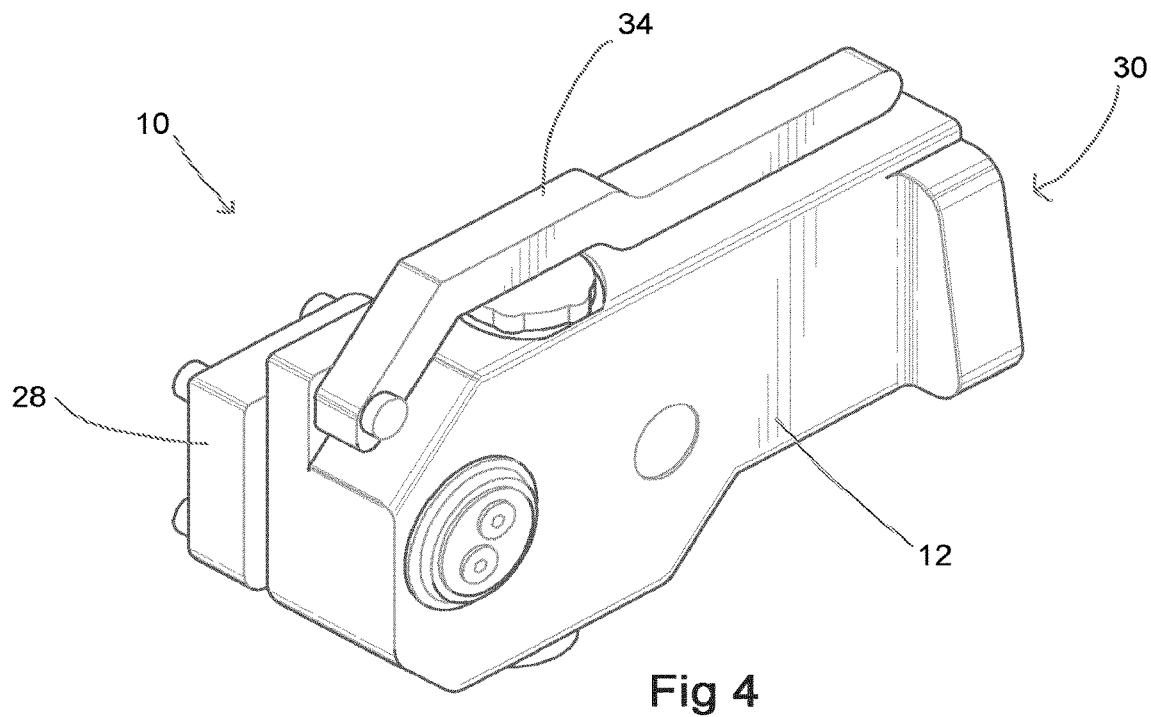
FIG. 4 is a diagrammatic perspective view representation of another example of a safety valve for a hydraulic of pneumatic tool, in accordance with this disclosure.
Figure 5:
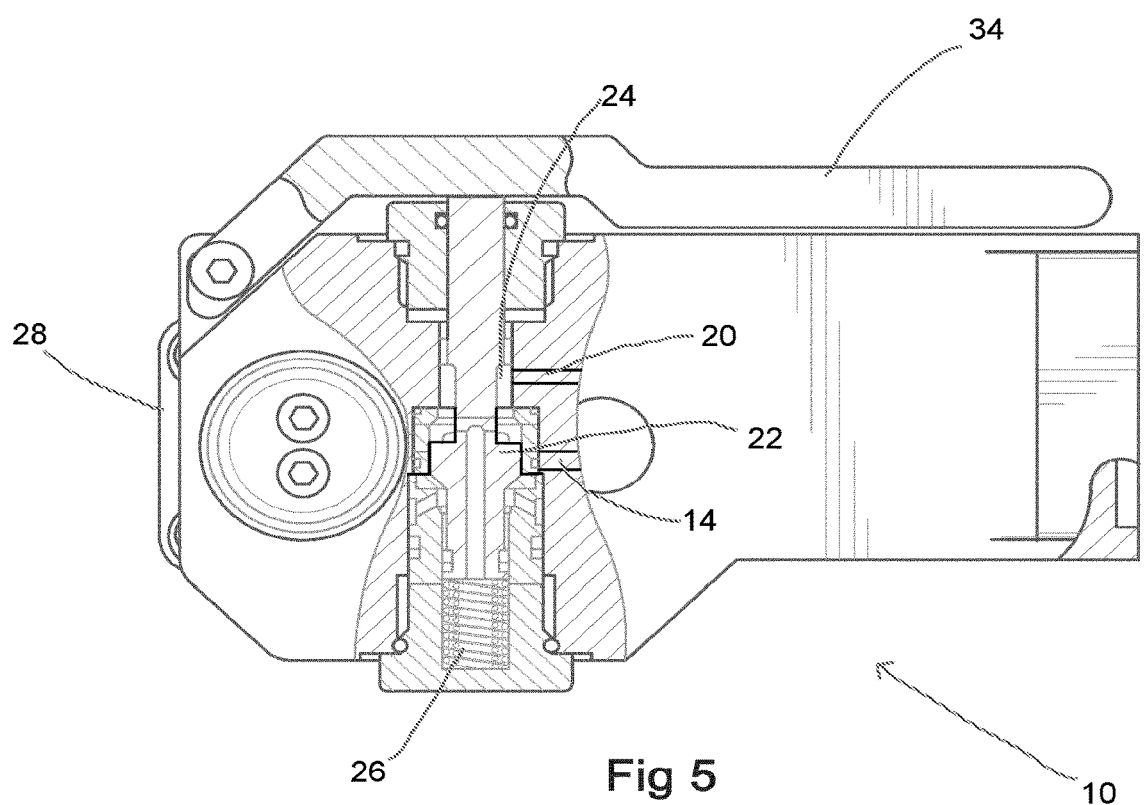
FIG. 5 is a diagrammatic side cross-sectional representation of the safety valve of FIG. 4.
Figure 9:
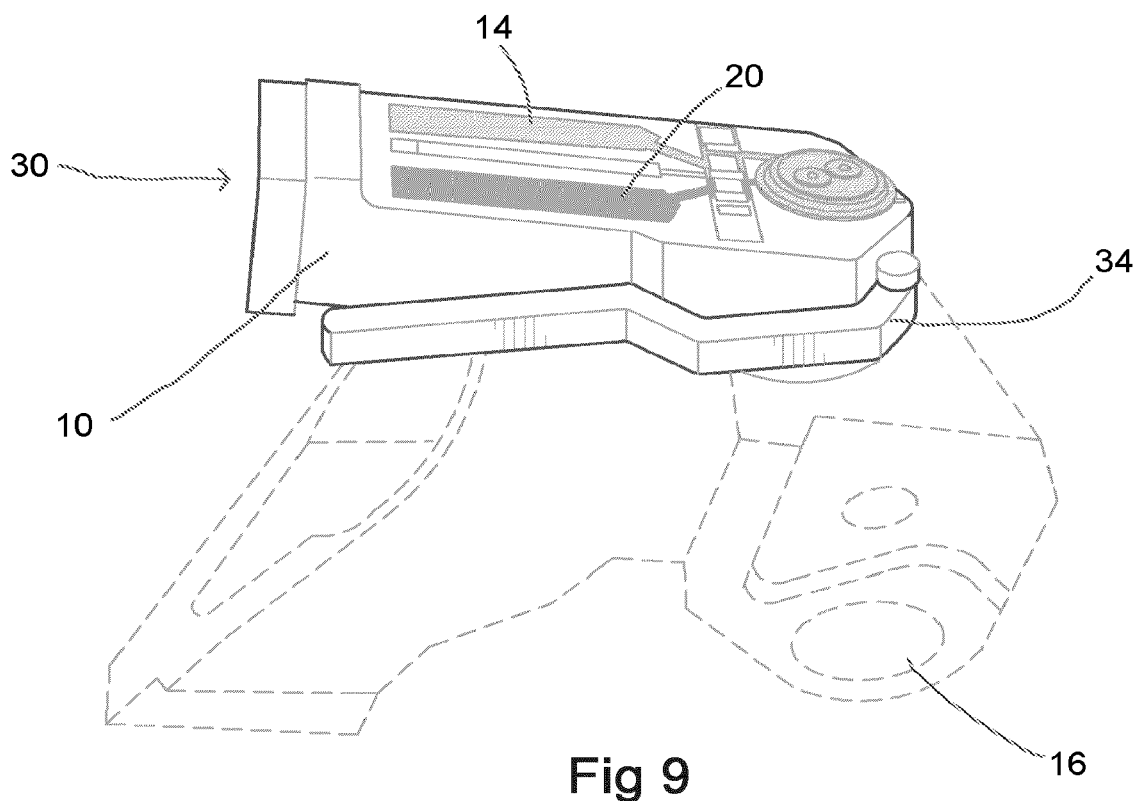
FIG. 9 is a diagrammatic side perspective view representation of the safety valve in an inactive position.

The body 12 further comprises a diverter 22 which is displaceable between an active position (refer to FIGS. 3 and 10) and an inactive position (refer FIGS. 1, 2 and 9).

When the diverter 22 is in the active position, the diverter 22 redirects the fluid via a shunting passage 24 from the incoming fluid passage 14 to the return passage 20 to prevent operation of the tool head 16. Conversely, when the diverter is in the inactive position, fluid is allowed to pass freely through the incoming and return passages 14 and 20, respectively, to allow operation of the tool head 16.

In one embodiment, the diverter 22 may include a conduit or channel which becomes the shunting passage 24 when the diverter is moved into the active position. Alternatively, in another embodiment, the diverter 22 may redirect fluid to a shunting passage 24 which is defined by the body 12 when the diverter 22 is moved into the active position.

The body also comprises some manner of biasing means 26, typically a spring, which biases or urges the diverter 22 into either the active or inactive position, depending on requirements.

The diverter 22 is typically configured to be manually actuated by defining some manner of actuator, such as a button, switch or handle 34 on an outside portion of the body 12, as shown. When this actuator, i.e. switch, button or handle, 34 is actuated or depressed, it generally counteracts the biasing means 26.

As such, it is to be appreciated that the biasing means 26 can be configured for either fail-safe or fail-dangerous operation of the tool head 16. In a fail-safe configuration, actuation of the diverter 22 into the inactive position is required to allow operation of the tool head 16. Alternatively, in a fail-dangerous configuration, the tool head 16 can operate until actuation of the diverter 22 into the active position does not allow the tool head 16 to operate.

In a preferred embodiment, the biasing means is typically in a fail-dangerous configuration, so that when an operator is handling the tool head 16 with the safety valve 10 fitted, the diverter 22 must be actuated so that the tool head 16 does not operate. This generally facilitates the practice where an operator's hands are removed from the tool for safety's sake, i.e. the tool head 16 is positioned and then the operator steps away before the tool head 16 operates.

This fail-dangerous configuration is particularly useful where two operators are involved. In use, a first operator handles the tool head 16 with safety valve 10 fitted, the operator actuating the diverter 22 into the active position as long as his/her hands are on the tool head 16.

In the event where a second operator incorrectly activates the fluid reservoir 18 whilst the first operator is still handling the tool head, the fluid will safely bypass the tool head 16 and return to the fluid reservoir 18, preventing possible injury to the first operator.

Only once the first operator has correctly positioned the tool head 16 where required and removes his/her hand from the diverter button or switch 34, is the tool head 16 able to operate upon activating of the fluid reservoir 18.

Accordingly, the body 12 of the safety valve 10 is generally shaped, dimensioned and configured to engage the tool head 16 in an ergonomic fashion. This enables an operator to use the tool head 16 with the diverter in an easily actuatable location.

As such, the body 12 generally defines some manner of tool head connection 28 whereby the tool head 16 can be arranged in fluid communication with the incoming and return fluid passages 14 and 20. In this case, the tool head connection 28 is configured specifically to connect the safety valve 10 with a HYTORC™ tool head. However, other connections are possible and within the scope of this disclosure.

Similarly, the body 12 generally defines a fluid reservoir connection 30 whereby the fluid reservoir 18 is also arranged in fluid communication with the incoming and return fluid passages 14 and 20. This fluid reservoir connection 30 is typically in the form of fluid hose connectors or couplings 32, e.g. press-fit couplings. Such press-fit hose connectors or couplings are well known in the art and will not be described in any further detail.

The fluid reservoir 18 is typically connected to the safety valve 10 by means of fluid hoses 36, as is well known in the art. This allows some separation between the fluid reservoir 18 and the tool head 16 and valve 10. The fluid reservoir 18 can be large and bulky and this separation allows for the tool head 16 to access otherwise inaccessible locations.

Figure 6:
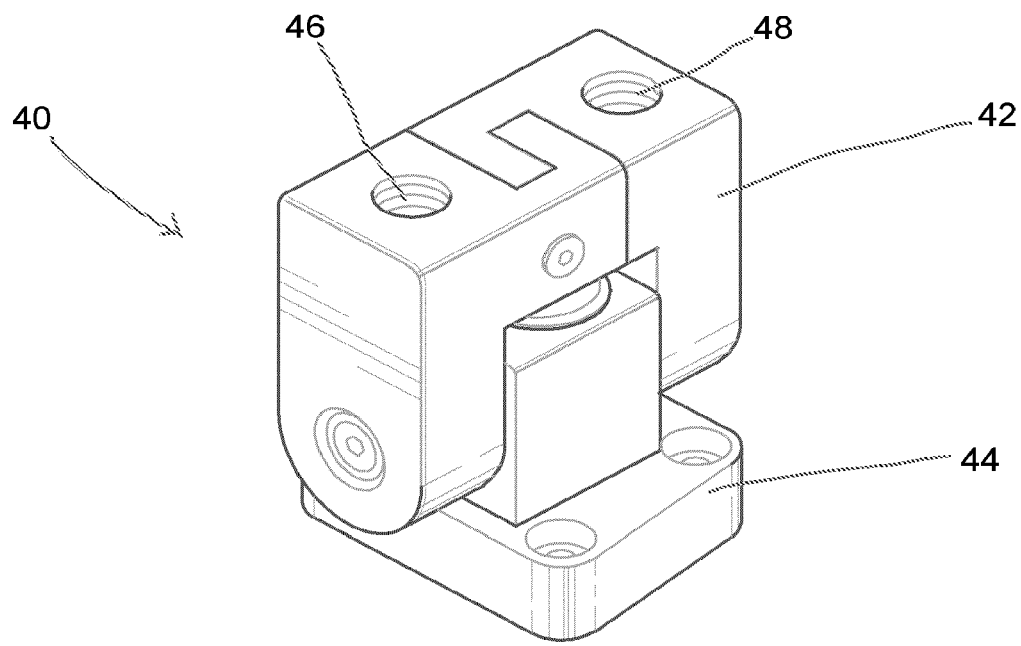
FIG. 6 is a diagrammatic perspective view representation of a bi-directional swivel joint for the safety valve.
Figure 7:
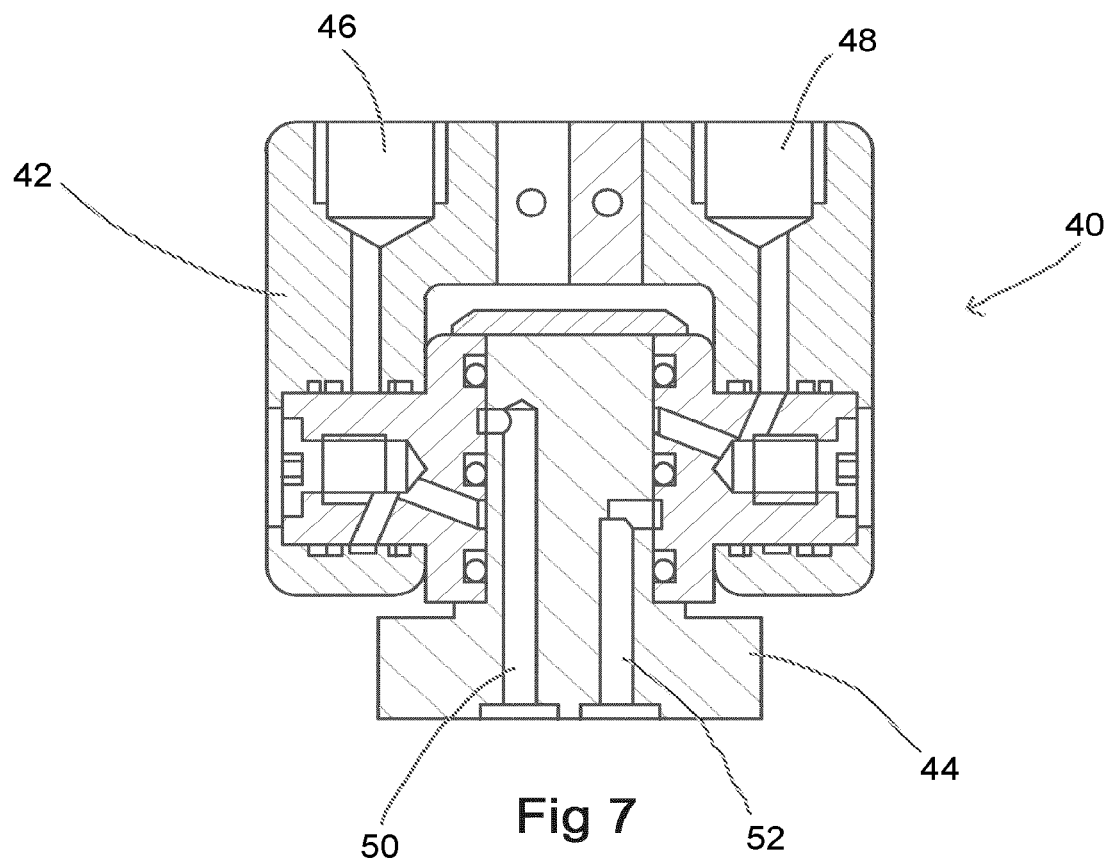
FIG. 7 is a diagrammatic side cross-sectional representation of the bi-directional swivel joint of FIG. 6.
Figure 8:
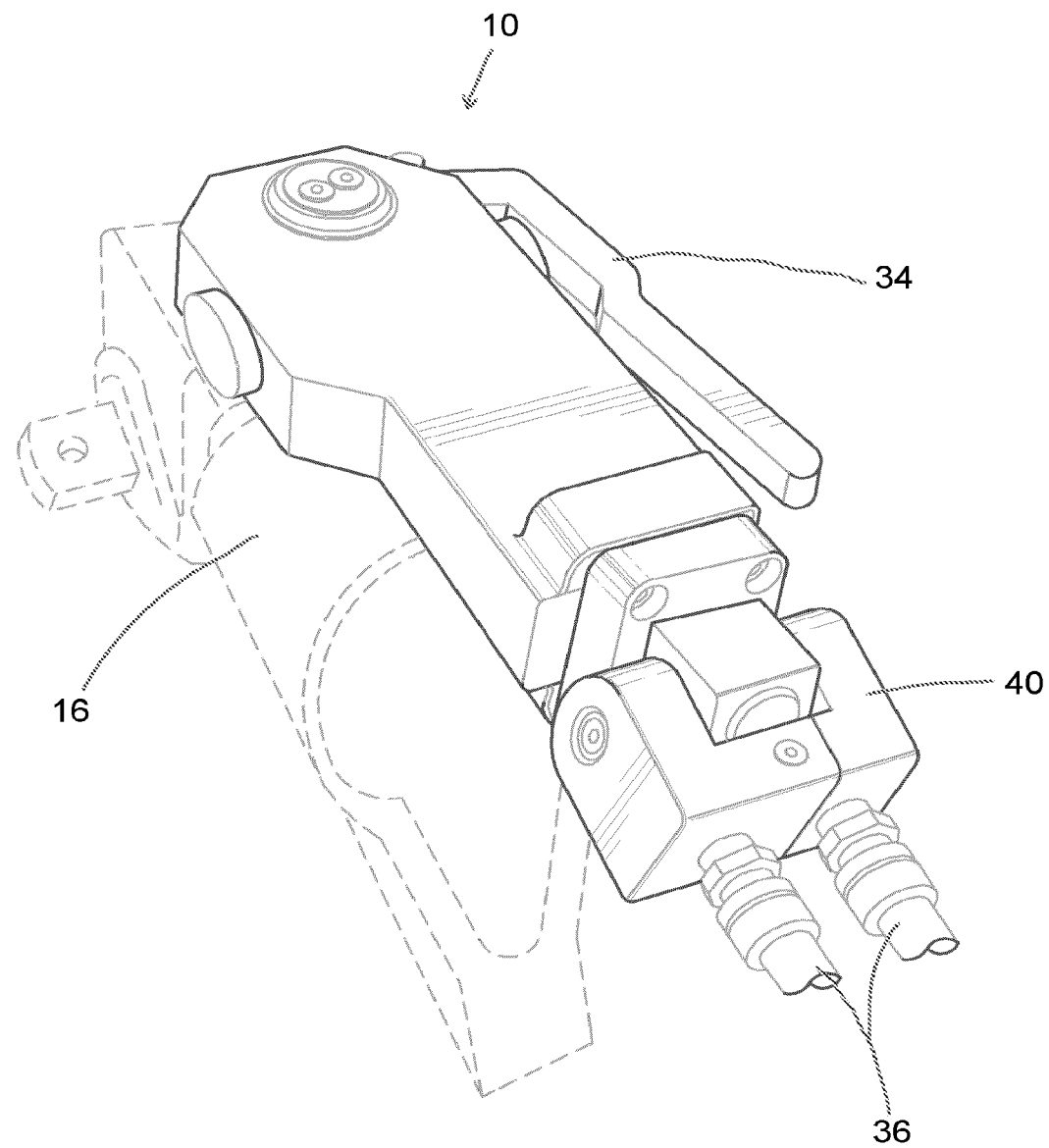
FIG. 8 is a diagrammatic perspective view representation of the safety valve of FIG. 4 attached to a hydraulic of pneumatic tool and arranged in communication with a fluid reservoir by means of the bi-directional swivel joint of FIG. 6.

FIGS. 6 to 8 show an example of a bi-directional swivel joint 40 that finds particular application in arranging the safety valve 10 in fluid communication with hoses 36 to allow swiveling of the safety valve 10 with respect to such hoses 36.

Typically, the bi-directional swivel joint 40 comprises a lower part 42 defining a fluid inlet 46 and a fluid outlet 48, as shown. The inlet and outlet 46 and 48 are generally attached to hoses 36, as shown in FIG. 8. In addition, the swivel joint 40 comprises an upper part 44 which is operatively attached to safety valve 10, as shown.

The upper part 44 of swivel joint 40 generally comprises internal channels 50 and 52, as shown, that are arranged in fluid communication with inlet and outlet 46 and 48, respectively. Both upper and lower parts 42 and 44 are configured and adapted so that said parts 42 and 44 arrange channels 50 and 52 in fluid communication with inlet and outlet 46 and 48, whilst allowing said parts 42 and 44 to swivel with respect to each other. Typically, the swivel joint 40 also includes a plurality of O-ring seals to seal such channels, inlets and outlets against fluid leakage.

FIG. 9 shows an example of the safety valve 10 with the handle 34, and associated diverter 22, in the inactive position, represented by the incoming passage 14 and return passage 20 shaded in different color. An operating fluid is thus able to pass through the tool 16 and return to the reservoir.

Figure 10:
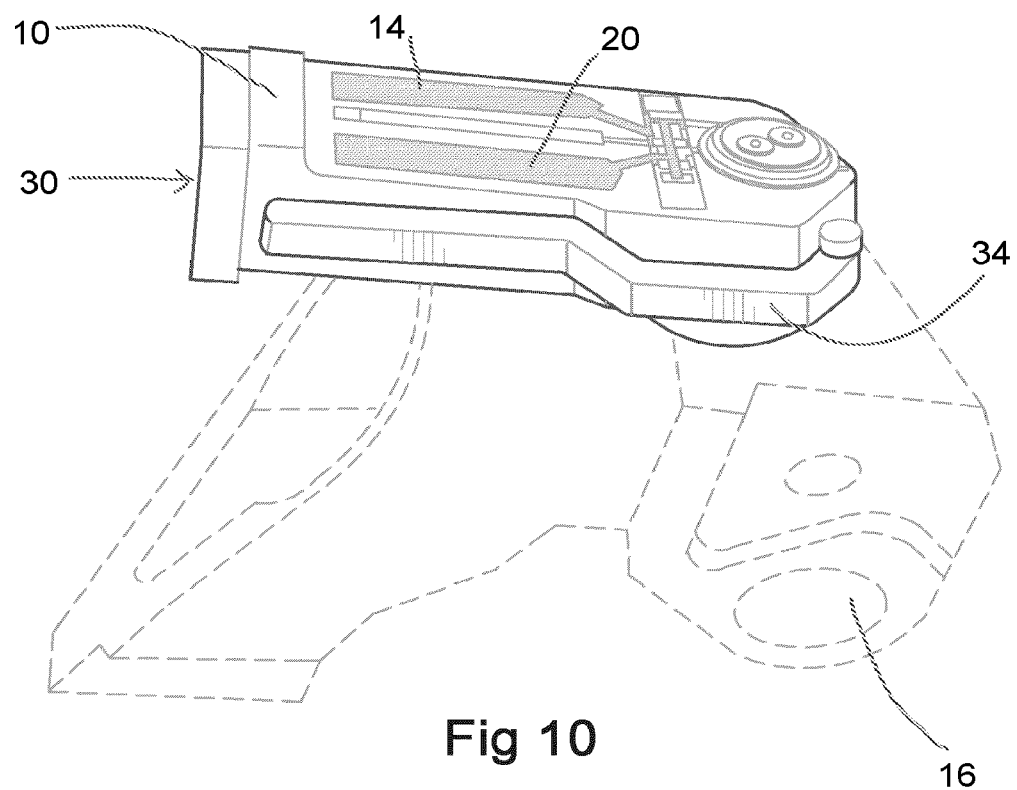
FIG. 10 is a diagrammatic side perspective view representation of the safety valve in an active position.

Conversely, FIG. 10 shows the safety valve 10 with the handle 34, and associated diverter 22, in the active position, represented by the incoming passage 14 and return passage 20 shaded in the same color. An operating fluid is diverted by the diverter 22 such that said fluid does not pass to the tool 16, but returns directly to the reservoir.

It should be appreciated that the scope of the invention is not limited to the scope of the embodiment described. Various modifications and improvements may be made to the embodiment described without departing from the scope of the invention.

It is believed that the invention disclosed herein is able to provide a safety valve for a pneumatic or hydraulic tool head which provides additional safety to an operator of the tool head, particularly where activation of the fluid reservoir is not under his/her direct control.

Throughout this specification, unless the context requires otherwise, the word "comprise" or variations such as "comprises" or "comprising", will be understood to imply the inclusion of a stated integer or group of integers but not the exclusion of any other integer or group of integers.

It is to be appreciated that reference to "one example" or "an example" of the invention is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise.

What is claimed is:

1. A safety valve for a hydraulic or pneumatic tool, the safety valve comprising:
   a body defining an incoming fluid passage via which fluid is able to pass from a fluid reservoir through the body to a tool head, and a return fluid passage via which fluid is able to return from the tool head through the body to the fluid reservoir;
   a diverter displaceably arranged between at least two positions, wherein in a first position of the at least two positions the fluid is able to bypass the tool head and return to the fluid reservoir to prevent operation of the tool head and in a second position of the at least two positions the fluid is able to flow to the tool head to allow operation of the tool head;
   a biasing means operatively biasing a tapered portion of the diverter into either a fail-safe position or a fail-dangerous position; and
   an actuator positioned directly on an outside portion of the body, wherein the actuator is configured so that actuation thereof counteracts the biasing means and actuates the diverter into one of the at least two positions.

2. The safety valve of claim 1, wherein the safety valve allows operation of the tool head when the actuator is actuated.

3. The safety valve of claim 1, wherein the safety valve allows operation of the tool head when the actuator is not actuated.

4. The safety valve of claim 1, wherein the body defines a tool head connection, whereby the tool head is arranged in fluid communication with the incoming fluid passage and the return fluid passage.

5. The safety valve of claim 4, wherein the tool head connection comprises fluid hose connectors.

6. The safety valve of claim 1, wherein the body defines a fluid reservoir connection whereby the fluid reservoir is arranged in fluid communication with the incoming fluid passage and the return fluid passage.

7. The safety valve of claim 6, wherein the fluid reservoir connection comprises fluid hose connectors.

8. The safety valve of claim 1, wherein the diverter defines a conduit which defines a shunting passage when in one of the at least two positions.

9. The safety valve of claim 1, wherein the diverter is configured to redirect fluid to a shunting passage defined by the body when in one of the at least two positions.

10. The safety valve of claim 1, wherein the biasing means comprises a spring.

11. The safety valve of claim 1, wherein the body is shaped, dimensioned and configured to engage the tool head so that an operator is able to use the tool head with the actuator in a manually actuatable location.

12. The safety valve of claim 1, wherein each of an incoming port and return port traverses the body.

13. The safety valve of claim 1, wherein an incoming port and aft return port are arranged in parallel with respect to each other.

14. The safety valve of claim 1, wherein the actuator comprises a switch, button, or handle.

15. The safety valve of claim 1, wherein the tapered portion comprises a proruption from a surface of the diverter closest to the biasing means.

16. The safety valve of claim 1, wherein at least the actuator, the body, the diverter, and the biasing means are capable of being held by one person.

17. The safety valve of claim 1, wherein the actuator is connected to the body.

18. The safety valve of claim 1, wherein the actuator moves in a direction that is coplanar with a largest dimension of the body.

19. A hydraulic or pneumatic tool assembly comprising:
a tool head;
a fluid reservoir for operatively supplying the tool head with hydraulic or pneumatic fluid;
a safety valve fitted to the tool head, wherein the safety valve has a body defining an incoming fluid passage via which fluid is able to pass from the fluid reservoir through the body to the tool head, and a return fluid passage via which fluid is able to return from the tool head through the body to the fluid reservoir;
a diverter displaceably arranged between at least two positions, wherein in a first position of the at least two positions the fluid is able to bypass the tool head and return to the fluid reservoir to prevent operation of the tool head and in a second position of the at least two positions the fluid is able to flow to the tool head to allow operation of the tool head;
a biasing means operatively biasing a tapered portion of the diverter into either a fail-safe position or a fail-dangerous position; and
an actuator positioned directly on an outside portion of the body, wherein the actuator is configured so that actuation thereof counteracts the biasing means and actuates the diverter into one of the at least two positions.

20. The tool assembly of claim 19, wherein the fluid reservoir comprises a fluid storage means and a pump for supplying the fluid under pressure to the tool head via the safety valve.

21. The tool assembly of claim 19, wherein the fluid reservoir is arranged in fluid communication with the safety valve by means of hoses.

22. The tool assembly of claim 19, further comprising a bi-directional swivel joint arranged in fluid communication with the safety valve and the hoses to allow swiveling of the safety valve with respect to the hoses.

* * * * *